(12) United States Patent
Young et al.

(10) Patent No.: US 7,061,139 B2
(45) Date of Patent: Jun. 13, 2006

(54) SYSTEM FOR PROVIDING ASSURED POWER TO A CRITICAL LOAD

(75) Inventors: Douglas Gibbons Young, Henderson, NV (US); Herbert C. Healy, Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 561 days.

(21) Appl. No.: 10/255,921

(22) Filed: Sep. 26, 2002

(65) Prior Publication Data

US 2003/0025397 A1 Feb. 6, 2003

Related U.S. Application Data

(63) Continuation-in-part of application No. 09/782,402, filed on Feb. 13, 2001, now Pat. No. 6,465,910.

(51) Int. Cl.
*H02J 3/38* (2006.01)
(52) U.S. Cl. .......................................... 307/45; 307/64
(58) Field of Classification Search ............... 307/45, 307/64, 66
See application file for complete search history.

(56) References Cited

U.S. PATENT DOCUMENTS

| 4,004,947 | A | 1/1977 | Bloomfield | 429/17 |
|---|---|---|---|---|
| 5,401,589 | A | 3/1995 | Palmer et al. | 429/13 |
| 5,573,867 | A | 11/1996 | Zafred et al. | 429/17 |
| 5,579,197 | A | 11/1996 | Mengelt et al. | 361/93 |
| 5,783,932 | A | 7/1998 | Namba et al. | 322/16 |
| 5,986,354 | A * | 11/1999 | Nagao et al. | 307/64 |
| 6,011,324 | A | 1/2000 | Kohlstruck et al. | 307/64 |
| 6,198,176 | B1 | 3/2001 | Gillette | 307/64 |
| 6,198,177 | B1 | 3/2001 | Mao et al. | 307/66 |
| 6,288,456 | B1 | 9/2001 | Cratty | 307/64 |
| 6,304,006 | B1 * | 10/2001 | Jungreis | 307/64 |
| 6,583,523 | B1 * | 6/2003 | Bhate | 307/86 |
| 6,602,627 | B1 * | 8/2003 | Liu et al. | 429/23 |
| 2003/0012038 | A1 | 1/2003 | Welches et al. | 363/34 |

* cited by examiner

*Primary Examiner*—Brian Sircus
*Assistant Examiner*—Brett Squires
(74) *Attorney, Agent, or Firm*—Stephen A. Schneeberger (57) ABSTRACT

A first AC power source comprising a power plant (18), and a second power source, typically grid (10), are normally connected via a high speed isolation switching means (19) to provide sufficient AC power to a critical load (14). The power plant (18) comprises a power generating means, e.g. a fuel cell, (60) and a power conditioning system (PCS) (62) having an inverter (64). Power assurance means (65; 10", 66, 64, 70; 74, 75) is/are operatively connected to at least one of the first and second power sources to enhance an even and continuous supply of power to the critical load (14). The power assurance means (65; 10", 66, 64, 70; 74, 75) is/are operatively connected to the PCS inverter (64), and may be one, or a combination of, a surge suppression means (65), a double-conversion power connection means (10", 66, 64, 70) having a rectifier (66); and/or stored energy means (74), such as a capacitor (75).

20 Claims, 4 Drawing Sheets

MODE STATE TABLE

| FUEL CELL STATE | RECTIFIER 66 STATE | INVERTER 64 STATE | BREAKER 80 STATE | SSC BREAKER 80 COMMAND |
|---|---|---|---|---|
| ON | ON | ON | CLOSE | CLOSE |
| ON | OFF | ON | CLOSE | CLOSE |
| OFF | ON | ON | CLOSE | CLOSE |
| OFF | OFF | OFF | OPEN | OPEN |
| ON OR OFF | ON OR OFF | FAULT | OPEN | DON'T CARE (INCONSEQUENTIAL) |

SYSTEM FOR PROVIDING ASSURED POWER TO A CRITICAL LOAD

This application is a continuation-in-part of U.S. patent application Ser. No. 09/782,402 filed Feb. 13, 2001 now U.S. Pat. No. 6,465,910.

TECHNICAL FIELD

This invention relates generally to power systems, and more particularly to power systems for providing an assured, or uninterruptible, supply of electrical power to one or more critical loads. More particularly still, the invention relates to such power systems employing fuel cells as a source of electrical power.

BACKGROUND ART

By far, the most common source of electrical power for a great variety of loads is via the extensive power grid provided by the various electric utilities. The electrical power available on the utility grid is generally fairly reliable as to continuity and adherence to established standards of voltage, frequency, phase, etc. However, from time to time discontinuities and/or departure from those standards do occur. If they are brief or modest, most loads are relatively insensitive to those events. On the other hand, there are a growing number of loads which are relatively intolerant of even brief aberrations in the power supplied by the utility grid, with the principal example being computers, digital controls/controllers, and various types of electronic data processing devices. Even brief interruptions in the standardized supply of electric power by the utility grid may cause the computer or control to malfunction, with sometimes costly, and always bothersome, consequences.

In defining this concern, the Information Technology Industry Council (ITI), formerly the Computer Business Equipment Manufacturers Association (CBEMA), has developed a set of Power Acceptability Curves which establish the standards, or at least provide guidance, for determining the power norms which will assure continued operation of those types of loads. In that regard, a standard had been adopted indicating that a computer could tolerate a one half cycle or 8.3 ms power interruption, which standard has recently been changed by ITI to about 20 ms. On the other hand, some applications of multi-phase digital electronic equipment, such as motor controls and the like, may not tolerate interruptions greater than about 8.3 ms. The power available on the utility grids is not presently capable of meeting this requirement on a substantially continuous basis. Accordingly, it has been and is, necessary to provide supplemental power sources if it is important to assure that critical loads have a substantially continuous or uninterrupted supply of electrical power. For purposes of this application, a supply of power with interruptions or transfers of no greater than 8.3 ms duration, may be referred to as being "seamless", "substantially continuous", or "substantially uninterrupted".

Figures 1, 2:
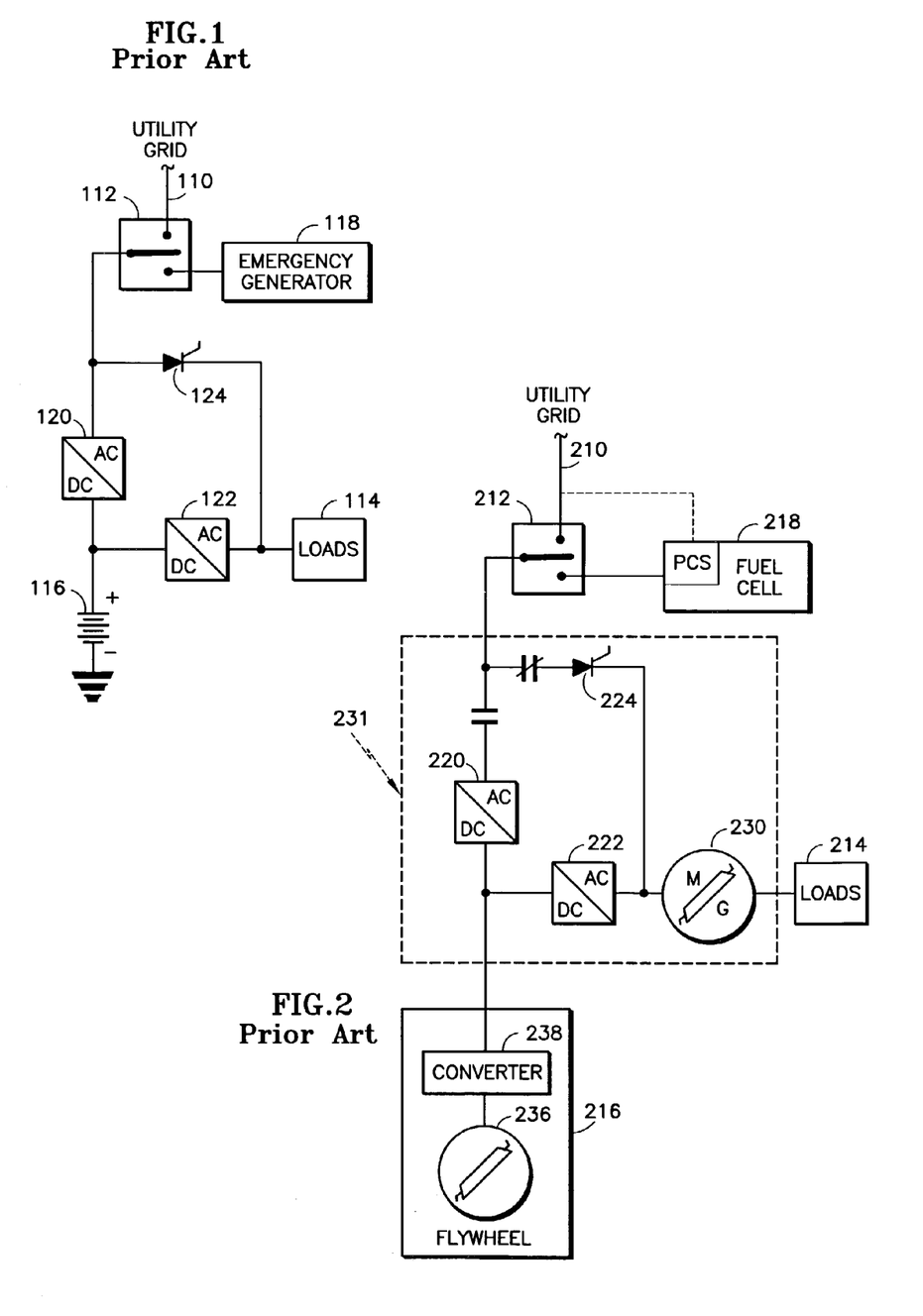
FIG. 1 is a simplified schematic block diagram of one type of uninterruptible power supply in accordance with the prior art.
FIG. 2 is a simplified schematic block diagram of an uninterruptible power supply employing fuel cell power plants in accordance with the prior art.

Referring to FIG. 1, there is illustrated one existing form of uninterruptible power supply (UPS), a so-called "on-line" or "double conversion" type, used to supply a critical load in those instances when the utility grid supply is interrupted or is outside of specified limits. The utility grid power supply normally appears on conductor 110, and is passed via normally-closed contacts of a 3-pole transfer switch 112 to a rectifier 120, which supplies the critical loads 114 via an inverter 122. However, to provide continued power in and during those intervals when the utility grid power is not within the specified limits, a backup battery 116 is provided to supply immediate power of limited duration, and an emergency electrical generator 118 is then connected to the other contact of transfer switch 112 to follow-up with a longer term temporary supply. To accommodate the use of battery 116 in a system which relies on AC power for the loads 114, it is necessary to provide the rectifier 120 to charge battery 116 and the inverter 122 to convert the DC supply from the battery to the necessary AC supply for the loads. A high speed switch 124 connected between the transfer switch 112 and the loads 114 operates as a bypass switch to provide temporary power if the inverter 122 or rectifier 120 must be serviced. Because the grid and loads are not normally directly connected, but rather the power to the loads is required to pass through a pair of converters with the aid of the UPS battery, this type of UPS is termed an "on-line" or "double conversion" type. This arrangement, though effective, requires a number of costly components that are in use only during the intervals when the utility grid power is unsatisfactory.

Another arrangement of a power system for providing substantially uninterrupted power to critical loads is described in PCT application US99/10833 for "Power System", published on Nov. 25, 1999 as Wo 99/60687, and which corresponds to U.S. Pat. No. 6,288,456 issued Sep. 11, 2001. Referring to FIG. 2 in the present application, the relevant portions of the invention described in that PCT application/U.S. Patent, are depicted in a very simplified, generalized form, with elements being numbered such that their last 2 digits are the same as their functionally equivalent counterparts in FIG. 1. The critical loads 214 receive substantially uninterrupted power from a motor-generator 230 within an uninterruptable power system module 231, which module also contains transfer switches, rectifiers and inverters. Several alternative electrical power sources are provided to maximize the continued powering of the motor-generator 230. One such power source may be the utility grid 210. Another source may be the fuel cell generator power plant 218. A transfer switching arrangement 212 enables one or the other of the utility grid 210 and the fuel cell 218 to normally provide the power to drive the motor-generator 230. This type of uninterruptible power supply is also of the "on-line" or "double conversion" type inasmuch as the grid is not directly connected to the loads 214, but acts through the rectifier and inverter converters and the flywheel and/or fuel cells to energize motor-generator 230 which in turn provides uninterrupted power. In fact, the fuel cell 218 is configured to operate in a grid connect (G/C) mode with the utility grid 210 for system economy, so in grid connected mode both the grid and the fuel cell supply the "grid" terminals of the transfer switch. In the event of failure of the grid supply 210, the fuel cell 218 is intended to serve as the continuing power source for the motor-generator 230. However, in such event, the fuel cell 218 must reconfigure from a "grid connect" (G/C) mode of operation to a "grid independent" (G/I) mode. The power conditioning system (PCS) portion of the fuel cell 218 includes associated inverters, switching transistors and breakers (not shown) that effect the conversion of DC power to AC power and that govern the fundamental G/C and G/I modes of fuel cell operation. That mode transition (from G/C to G/I) has typically required the fuel cell 218 and transfer switch 212 to interrupt power generation for up to 5 seconds. Such interruption is not "seamless", and would be of unacceptable duration for critical computer loads 214. Accordingly, a backup flywheel power source 216 provides immediate power of limited duration (similar to the battery source 116 in FIG. 1) to the motor-generator 230 at least during such mode conversions. That backup power source 216 is a flywheel 236 driving a bi-directional AC/DC converter 238. The converter 238 keeps the flywheel spinning during normal operation, and discharges the flywheel 236 during backup operation. The various transfer switches used in the transfer switching arrangement 212 and in the uninterruptable power system module 231 may be electromechanical, static, or a combination thereof, and serve to effect the various power switching functions.

While the Power System of the abovementioned PCT application/U.S. patent may provide a substantially uninterrupted source of power to various critical loads and may advantageously employ fuel cells as one of the main sources of the power, it nevertheless requires the use of considerable additional equipment that is complex and costly. For example, the separate motor-generator 230, and the backup power source 216 which includes the flywheel 236/converter 238 combination, represent necessary, but expensive, components in order to assure the degree of power continuity sought and required.

Another type of UPS is of the "stand-by" type wherein the grid is directly connected to the loads and a stand-by UPS remains idle, even if connected to the loads, until a switch disconnects the grid from the loads. An example of such a system is disclosed in U.S. Pat. No. 6,011,324. The fuel cell and associated inverters are normally connected to the loads, but in an idle standby mode while the grid supplies power directly to the loads. When the grid fails, the fuel cell is rapidly brought to full output power and a solid state switch disconnects the grid. Here, too, a number of costly components, including the fuel cell, are in use only during the intervals when the utility grid power is unsatisfactory.

From time to time in even a power system employing both grid power and fuel cell-based power to normally supply critical loads, there will be instances in which a fuel cell may not be available for reasons of maintenance, and the like. In the event the fuel cell-based portion of that power system has only one fuel cell, or, if multiple fuel cells, then in the unlikely event of their collective non-availability or inability to meet the full load demand, the critical load(s) could be faced with the power limitations/vagaries discussed above with respect to "grid-only" type power supply systems. Moreover, even when both the fuel cell(s) and the grid are available, the grid may be the source of voltage surges, against which it is desired to enhance the protection of the loads.

Accordingly, it is a principal object of the present invention to provide a power system for providing a substantially uninterrupted (seamless) supply of electric power to critical loads in a relatively economical manner.

It is a further object to provide such a power system in which one or more fuel cell power plant(s) are utilized to normally substantially-continuously supply power to the loads.

DISCLOSURE OF INVENTION

According to the invention, there is provided a relatively economical and reliable power system for providing substantially uninterrupted electric power to one or more critical loads. A first power source comprising at least one, and possibly multiple, fuel cell power plants, normally provides sufficient power to supply at least the critical loads. A second power source, such as the utility grid, also provides sufficient power to supply the critical loads. The fuel cell power plant(s) is/are adapted to be, and is/are, normally substantially continuously connected to the critical loads and are normally substantially continuously providing significant power to at least the critical loads. A high-speed isolation switch, or static switch, operates to rapidly and seamlessly connect and disconnect the utility grid to the critical load(s) and to the fuel cell power plant(s), for economical continuous usage of the fuel cell power plant(s). Significant economy is realized by having the substantially continuously operating fuel cell(s) normally substantially continuously connected to the load, and normally also to the grid. In this way, the fuel cell(s) may normally continuously deliver their rated power, with the requisite portion going to the critical loads and any excess being delivered to non-critical loads and/or the grid. The static switch may be one or more silicon controlled rectifiers (SCRs), or thyristors. Solid-state switch controls operate to rapidly switch the static switch in 4 ms, or less, to make seamless transfers between the first and second power sources. This switching speed is significantly faster than is obtained with conventional line commutation of thyristors. Further control electronics provide high-speed transitions (less than about 4 ms) in the operating modes of the power conditioning system (PCS) inverters associated with each fuel cell power plant(s). This assures that the fuel cell mode transitions, heretofore normally slow, are at a speed comparable to that of the static switch so as to provide substantially seamless power transfers of and between the first and second power sources. This allows continuous productive operation of the fuel cell power plant(s).

To further assure a continuous (i.e. uninterrupted) and even i.e., well-regulated, supply of power to the critical load, as either in the event of a fuel cell being temporarily disabled, as for maintenance, and/or from the possible event of a grid transient resulting from a grid aberration of short duration that exists during the opening of the static switch, one or more power assurance measures, or means, are provided in association with at least one of the grid and the fuel cell power plant power sources. One such power assurance measure is the inclusion of a line filter in the grid supply to prevent voltage spikes from appearing at the critical load while the static switch is opening. Another such power assurance measure is the re-directed connection of the grid to the fuel cell power plant inverter, via a rectifier, which assures the load of a redundant power source in the event the particular fuel cell is out of service and also adds a degree of isolation between the grid and load. Yet another such power assurance measure is the connection of a stored energy device to the inverter to ride through temporary grid interruptions when the particular fuel cell is out of service or, when only the fuel cell is operating, to temporarily supplement the fuel cell's power output when the load experiences an instantaneous increase that is momentarily beyond the fuel cell's capacity and thus causes a temporary decrease in voltage. These power assurance measures may be used singularly or in various combinations, with the greatest benefit being derived from the use of all.

The foregoing features and advantages of the present invention will become more apparent in light of the following detailed description of exemplary embodiments thereof as illustrated in the accompanying drawings.

BEST MODE FOR CARRYING OUT THE INVENTION

Referring to the Drawings, FIGS. 1 and 2 depict prior types of uninterrupted power systems as previously described in the Background Art.

Figure 3:
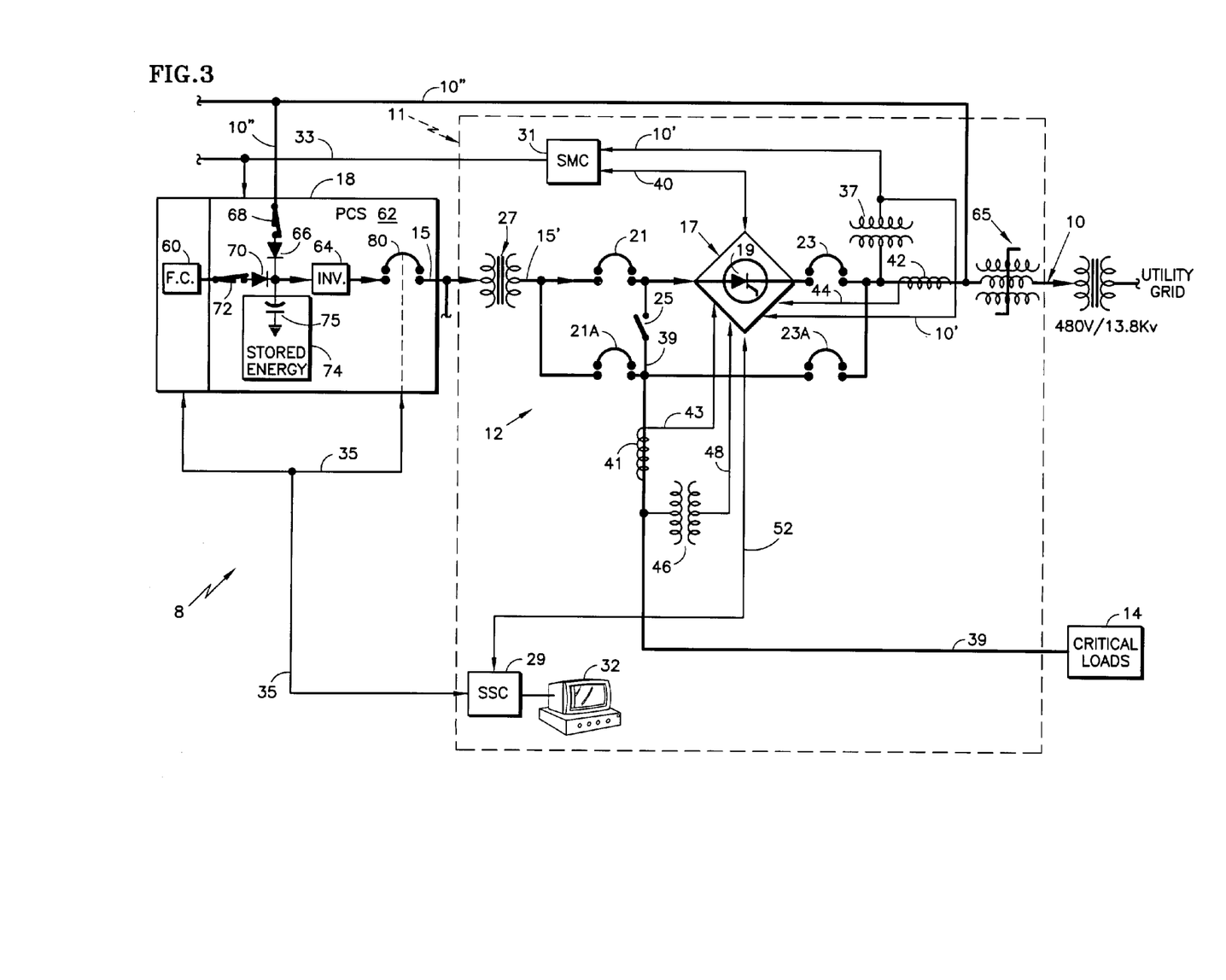
FIG. 3 is schematic block diagram of a power system employing a fuel cell power plant and grid interconnected in accordance with the invention to assure uninterrupted power to a critical load.

Referring to FIG. 3, there is depicted a schematic block diagram, partly in detail, of a power system 8 in accordance with the invention. The power system 8 is connected to utility grid bus 10, and employs one or more fuel cell power plant(s) 18 at a site, for supplying 3-phase power substantially continuously to and through load contactors (not shown), to load(s) 14, usually also at the site. For simplicity, a "one line" diagram, or representation, is used herein to depict the 3-phase supply lines, as well as their included switches, etc. The grid 10, the fuel cell power plant(s) 18, and the load(s) 14 are interconnected and controlled through a site management system (SMS), generally represented by the broken line block, or grouping, 11. The load(s) 14 typically include a number of individual customer loads, at least some of which require a substantially continuous supply of power and are thus deemed "critical loads". The critical loads 14 are typically computers, control devices employing computers, and/or electronic data processing devices. For convenience of explanation and visual distinction, the portions of the schematic carrying the relatively higher voltage/current/power to the load(s) 14 are bolded, in contrast with the lower-voltage, control portions of the system 8.

The utility grid bus 10 normally provides power at 480 $V_{ac}$ and 60 Hz, as does the fuel cell power plant(s) 18 via lead, or bus, 15. Switching gear, generally designated 12, serves to interconnect the fuel cell(s) 18, the load(s) 14 and the utility grid 10. In this way, the fuel cell power plant(s) 18 are available and connected for supplying electrical power on a full time basis to the loads 14 and/or to the utility grid 10, for economical usage of the fuel cell(s). The switching gear 12 includes a high-speed isolation switch, such as static switch module 17, for selectively connecting and disconnecting the utility grid bus 10 to the loads 14 and to the fuel cell power plant(s) 18, as will be described. The static switch module 17 includes a 3-pole electrically operated static switch 19 rated at 2000 amperes and capable of performing seamless switching transfer of power in about ¼ cycle (about 4 ms). The switching gear 12 further includes several inter-tie or breaker switches 21, 21A, 23, 23A, and isolation switch 25, for further selectively connecting and disconnecting the fuel cell power plant(s) 18, loads 14, utility grid bus 10 and static switch module 17, relative to one another, primarily to isolate the static switch 19 for servicing and continue to provide power to the load(s) 14. A secondary purpose is to allow large fault currents to flow through breaker 23A instead of static switch 19 if such a fault in the load 14 should occur.

Although the invention is also useful in and applicable to power systems having multiple fuel cell power plants 18, its greatest relative value is in a power system 8 having a single power plant, as shown in the present embodiment. The fuel cell power plant 18 is connected to provide power to the loads 14 and/or to the utility grid 10. In an exemplary embodiment, each fuel cell power plant 18 may be a 200 kw UTC Fuel Cell PC25™C power plant, for providing up to 200 kilowatt of power. In addition to a fuel processor not separately shown, the fuel cell power plant 18 includes a fuel cell assembly 60 and a power conditioning system (PCS) 62 that contains a solid-state inverter 64 that converts DC power to AC power at the desired voltage and frequency. Control of and by the PCS further enables conversion of the mode of operation of a fuel cell power plant 18 from G/C to G/I, and vice versa, as will be described in greater detail. When used in G/C mode, the variable controlled by the PCS 62 is power delivered (both real and reactive). When used in the G/I mode, the variables controlled are output voltage and frequency, and, if multiple power plants 18 are involved, phase. A controllable circuit breaker 80 is connected to the output of the inverter 64 and is normally closed when fuel cell 60 is operating, to provide power output from the respective power plant 18. The output of the fuel cell power plant(s) 18 is connected to bus 15, which is connected through a delta-to-wye transformer 27 and bus 15' to the switching gear 12. The transformer 27 provides a separately derived neutral/ground system for the load 14, and also provides isolation between the fuel cell PCS and the load 14 and/or the utility grid bus 10.

A site supervisory control (SSC) 29 provides the operator interface for the system 8 and may be responsible for control of the system, usually at a high level. The SSC 29 allows the operator to issue high level commands such as "start", "stop", and the like. The SSC 29 may include one or more programmable logic controllers, data processors, computers, sensors, etc. to effect the control of the various components and functions of the system 8. An operator console 32 provides a display and input capability for the SSC 29. The SSC 29 may also provide some system control of switching gear 12, as through a link 52, with principal local control of that switching gear occurring automatically by the static switch 19. Moreover in accordance with the invention, the SSC 29 may serve as the control intermediary for control of static switch 19 if a/the fuel cell 60 is not available for power generation and for control of circuit breaker 80 of a respective power plant 18, as will be described.

There is also provided a site management control (SMC) 31 for providing direct control of the PCS 62 of the fuel cell power plant(s) 18, in response to signals from the static switch module 17, as well as a grid voltage reference signal 10' described below. The SMC 31 also may be composed of computers and associated sensors and control circuitry. The SMC 31 may be viewed and considered as an included portion of the SMS 11. Control bus 33 exchanges control signals between the SMC 31 and the PCS 62 of the fuel cell power plant(s) 18. Control signals are also exchanged between the SSC 29 and the fuel cell 60 and PCS 62 including circuit breaker 80, of the fuel cell power plant(s) 18, via control bus 35. Control signals are exchanged between the SMC 31 and the static switch module 17 via control bus 40. A voltage, or potential, transformer 37 senses the 480 $V_{ac}$ grid voltage and communicates the stepped-down 120 $V_{ac}$ value, via bus 10', to the SMC 31 and the static switch module 17 for the purpose of providing control signals indicative of the grid's voltage, phase and frequency. The depicted location and quantity of transformer(s) 37 is mainly symbolic, and it should be understood that such transformer(s) may, alternatively, be incorporated as part of the control circuit or module for which the control signal is provided. A current transformer 41 senses the load current in a power bus path 39 connected to the loads 14, and communicates the value to the static switch module 17 via bus 43. Similarly, current transformer 42 senses grid current and communicates the value to the static switch module 17 via bus 44, and voltage transformer 46 senses load voltage and transmits it to the static switch module 17 via bus 48.

Figure 4:
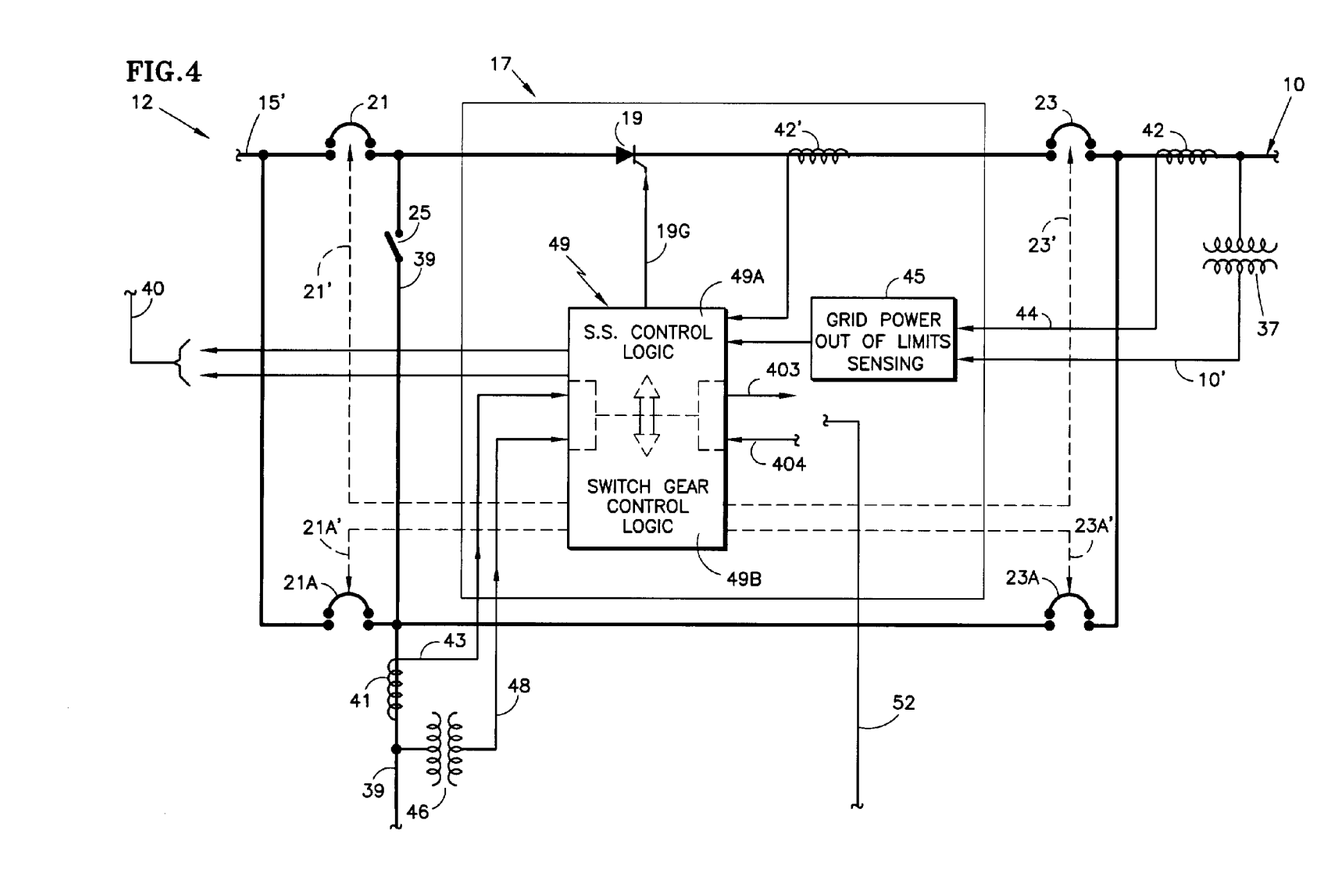
FIG. 4 is a schematic block diagram illustrating the static switch in greater detail.

For a further consideration of the switching gear 12, with reference additionally to FIG. 4, the power bus 15' from the fuel cell power plant(s) 18 is connected through breaker 21 to one pole of the static switch 19. The power bus path 39 extends from that pole of the static switch 19 through a normally-closed isolation switch 25 to the loads 14. The utility grid power bus 10 is extended to the other pole of the static switch 19 through breaker 23. The breaker switches 21 and 23 are intended to be closed during normal operation, such that power from the fuel cell power plant(s) 18 and/or the utility grid 10 may be supplied to the loads 14, assuming the static switch 19 is closed. Similarly, assuming the power delivered by the fuel cell power plant(s) 18 to the critical loads 14 is less than the cell's entire power output, the excess power from the fuel cell power plant(s) 18 may be delivered through the static switch 19 to the utility grid, or at least to customer non-critical loads (not shown) located on the grid side of static switch 19. In fact, this is the preferred economic mode of operation in that it maximizes the use of the fuel cell power plant(s) 18 and minimizes the need for and cost of, power from grid 10.

A bypass breaker switch 21A, connected from power bus 15' to the power bus path 39 between the loads 14 and the isolation switch 25 and being normally open, serves, when closed, to bypass breaker switch 21 for purposes of maintenance or isolation. Similarly, a bypass breaker switch 23A, connected from the utility grid bus 10 to the power bus path 39 between the loads 14 and the isolation switch 25 and being normally open, serves, when closed, to bypass breaker switch 23 and static switch 19 to supply grid power to loads 14, in the event the static switch fails or during maintenance or during a load fault sufficiently large to exceed the rating of the static switch. Breakers 21, 23, and 23A are electrically operated and are automatically controlled by the static switch 19 to perform transfers in 5 or 6 cycles, e.g., about 80–100 ms. The breaker switch 21A and isolation switch 25 are manual. The switches 21, 23, and 23A can also be manually controlled by the SSC 29. Each of the switches 21, 21A, 23, 23a, and 25 is rated 2000 amperes; and the circuit breakers have a fault interrupting rating of 65 kaic. The general communication link 52 between the switching gear 12 and the SSC 29, serves to convey appropriate status and manual control signals therebetween for the static switch 19 and the several breakers 21, 23, 23A, etc. Control logic 49 associated with static switch module 17, and particularly a switchgear control logic portion 49B thereof, serves to control the several breakers and switches 21, 21A, 23, and 23A, as represented by the broken line control paths 21', 21A', 23', and 23A' extending thereto. The control logic 49 is generally comprised of a high-speed logic portion 49A for rapidly controlling the static switch 19, and a relatively slower-speed portion 49B for controlling the remainder of switchgear 12.

Referring still further to FIG. 4, the static switch module 17 is depicted in greater detail. Although the static switch 19 is in fact three pairs of SCRs (thyristors), each pair being connected in parallel-opposed relation for conduction in either direction if the respective control gates 19G are enabled, only one of those SCRs is depicted in this view. The three pairs of SCRs are respectively for each of the 3 phases of power supply. Normally, the control gates 19G are connected in common and controlled in unison. Power on utility grid bus 10 and/or power on the fuel cell bus 15/15' may flow through the SCR's 19 when the control gates 19G are enabled, thus allowing either source to power the loads 14 and the fuel cell power plant(s) 18 to also provide excess power to the grid 10.

The normal mode is G/C in which the utility grid 10 and the fuel cells 18 are connected. The module 17 includes circuitry 45 for sensing when the supply of power from the utility grid bus 10 is out of limits. Typically, these limits include a voltage and a current range relative to the standard or nominal values, and the sensing circuitry 45 provides a signal on lead 47 to control logic 49, and static switch control logic 49A thereof specifically, to indicate when the grid is outside those limits. The sensing or detection circuitry 45 is fast acting, providing a response in about 2 ms. Although not depicted, a separate fast acting frequency detector may monitor the grid frequency and provide an "in" or "out" "of limits" signal to the static switch control logic 49A. "Out of limit" grid signal values include, for example,: a) instantaneous grid voltage magnitudes, on any phase, outside the range of 480 v +8% to −15%; b) instantaneous over-current, on any phase, greater than 2,000 amperes; c) frequency deviations from nominal 60 Hz value for more than 0.5 sec.; as well as others. The control logic 49A acts in response to the grid going out of limits, to provide a signal to the SCR gates 19G to disable them. The SCR's 19 will rapidly commutate off, thereby disconnecting the utility grid bus 10 from direct connection with the loads 14 but, in accordance with the present invention, may maintain an alternate, preferred connection with the PCS 62 of the fuel cell power plant(s) 18 as will be explained. A current sensor 42' senses the current through the SCRs and provides an indication to the control logic 49A of the occurrence of zero current through the SCRs. This information is used by the logic 49A to make the SCR commutation faster. This entire action typically occurs in about ¼ cycle (4 ms), thus facilitating a seamless transfer of power sources directly connected to the loads 14, from both the grid 10 and the fuel cell power plant(s) 18, to the fuel cell power plant(s) 18 alone, with the fuel cell power plant(s) reconfiguring as rapidly. This is significantly faster than the 8 ms or more required to commutate an SCR using conventional line commutation. The sensing circuitry 45 causes the static switch 19 to rapidly open when an out of limit grid condition is sensed, and may return it to conductivity as rapidly when it determines that the grid power supply has been returned to within the acceptable limits. The control logic 49B also uses the voltage and current sensors 37, 41, 42, and 46 to operate the switching gear devices 21, 23, and 23A under various grid, load, and fuel cell out of limit or fault, conditions. For example, if a load over-current condition exists such that the current rating of the static switch 19 may be exceeded, switch 23A is closed to conduct the fault current to the load 14, by-passing the static switch. As a further example, a fuel cell fault can be indirectly detected by observing a low load voltage and perhaps a high grid current but no load overcurrent. In such event, switch 21 is opened to isolate the fuel cell fault from the load 14. The control logic 49A also provides certain mode signals as part of the control signal bus 40. For manual control from the SSC 29, a G/I status signal is provided by control logic 49 on lead 403, and a SW19 Enable signal is received on lead 404. The signals on leads 403 and 404 may be conveyed via communications link 52.

To the extent a more detailed description of the mode control performed in the PCS 62 via the SMC 31 is required, reference may be made to allowed U.S. patent application Ser. No. 09/782,402, now U.S. Pat. No. 6,465,910, entitled System for Providing Assured Power to a Critical Load. That application, Ser. No. 09/782,402, now U.S. Pat. No. 6,465, 910, is the "parent" of the present application, is assigned to the assignee of the present application, and is incorporated herein by reference to the extent consistent herewith. Suffice it to say for the purposes of the present invention, that the switching gear 12 including static switch 19, as well as the PCS 62, are controlled to provide rapid disconnection of the grid 10 from its direct connection with the critical loads 14 through static switch 19, and rapid change of operating mode of the fuel cell power plant(s) 18, from G/C to C/I, in the event of an unacceptable variation in the grid power quality. The fuel cell power plant(s) 18 will normally have been continuously operating and connected to the critical load 14, and the mode transition is sufficiently fast that any power interruption from loss of the grid is less than about 8 ms, being about 4 ms, such that power to the critical loads 14 is substantially uninterrupted.

Normal operation contemplates both the grid 10 and the fuel cell(s) 60 of power plant(s) 18 operating satisfactorily to provide power to at least the critical load(s) 14, and perhaps also to the grid by the fuel cell power plant(s), and for the fuel cell power plant(s) to seamlessly provide power to the loads 14 in the event of grid aberrations. However, from time to time it is, or may be, necessary for the fuel cell(s) 60 to be off-line for reasons of maintenance and the like. It has been determined that an overall power-producing availability of an individual fuel cell 60 is typically about 97%, however that evinces the potential for some short intervals when the fuel cell 60 is not available. This may not be a serious problem if other fuel cells and/or the grid 10 are adequate to meet the needs of the load(s) 14. However, in the event the capacity of any further fuel cell(s) 60 is insufficient to meet the needs of the critical load(s) 14, as is particularly the case when only one fuel cell power plant 18 is present in the power system 8, the present invention provides for assuring even and continuous power to the load(s) 14. This assurance of even and continuous power also extends, in one or more aspects of the invention, to instances of certain grid transients, whether or not the fuel cell(s) 60 is operating, and may even extend to certain significant transient increases in power to the load(s) 14 while the fuel cell(s) 60 is operating, particularly in the instance when the power capacity of the fuel cell(s) 60 is exceeded, as may occur for a single fuel cell and/or a fuel cell array of limited capacity.

Returning to FIG. 3 and in accordance with one aspect of the invention, a line filter 65 is connected in power system 8 at the input from grid 10. The line filter 65 is in fact three filters, one in each of the three lines of the three-phase system. The line filter 65 is of an inductive value sufficient to attenuate transients, or voltage spikes, that might occur while the static switch 19 opens during a grid aberration of short duration (i. e., sub-cycle). In this way, such transients are attenuated prior to their application to the circuitry generally, and particularly the load(s) 14. The line filter preferably has sufficient inductive capacity to accommodate the range of most likely surges. Accordingly, the line filter 65 acts as a buffer to protect the customer load(s) 14 from transients that may occur on the grid 10, whether or not the fuel cell 60 is operating normally.

In accordance with another aspect of the invention, the grid 10 provides power to the load(s) 14 via the inverter 64 associated with a PCS 62 in a fuel cell power plant 18 during such intervals as the associated fuel cell 60 may be out of service. A branch 10" of the grid 10 extends to the inverter 64 of PCS 62 of fuel cell power plant 18 via a unidirectional conducting device, such as power rectifier 66, in the PCS 62. The grid branch 10" is connected to the grid 10 prior to the static switch 19, preferably between the line filter 65 (if present) and the static switch 19 to derive the advantages of the filter 65. A normally-closed safety switch 68, which may be manual, is connected in series with the rectifier 66 to isolate that branch in the event it the rectifier is being serviced. Correspondingly, the D. C. output of the fuel cell 60 is connected to the inverter 64 via another unidirectional conducting device, such as power rectifier 70. Similarly, a normally-closed safety switch 72, which may be manual, is connected in series with the rectifier 70 to isolate that branch in the event the rectifier 70, the fuel cell 60, and/or the rectifier 66 is being serviced.

The inverter 64 is a DC-to-AC power converter and, under normal fuel cell operation, the DC power from the fuel cell 60 flows directly through the rectifier 70 to the inverter 64, where it is inverted to provide AC power through circuit breaker 80 to bus 15 and ultimately, to the load(s) 14. During normal operation with the fuel cell 60 operational, AC power from the grid 10, 10" is rectified by rectifier 66 and is available as DC power at the input of inverter 64 to supplement the power from the fuel cell 60. Because the fuel cell 60 and the grid 10, 10" are, or may be, connected effectively in parallel as inputs to the inverter 64, the presence of the two rectifiers 70 and 66 serves to prevent "backfeeding" or a "sneak" path from one power source to the other.

Figure 5:
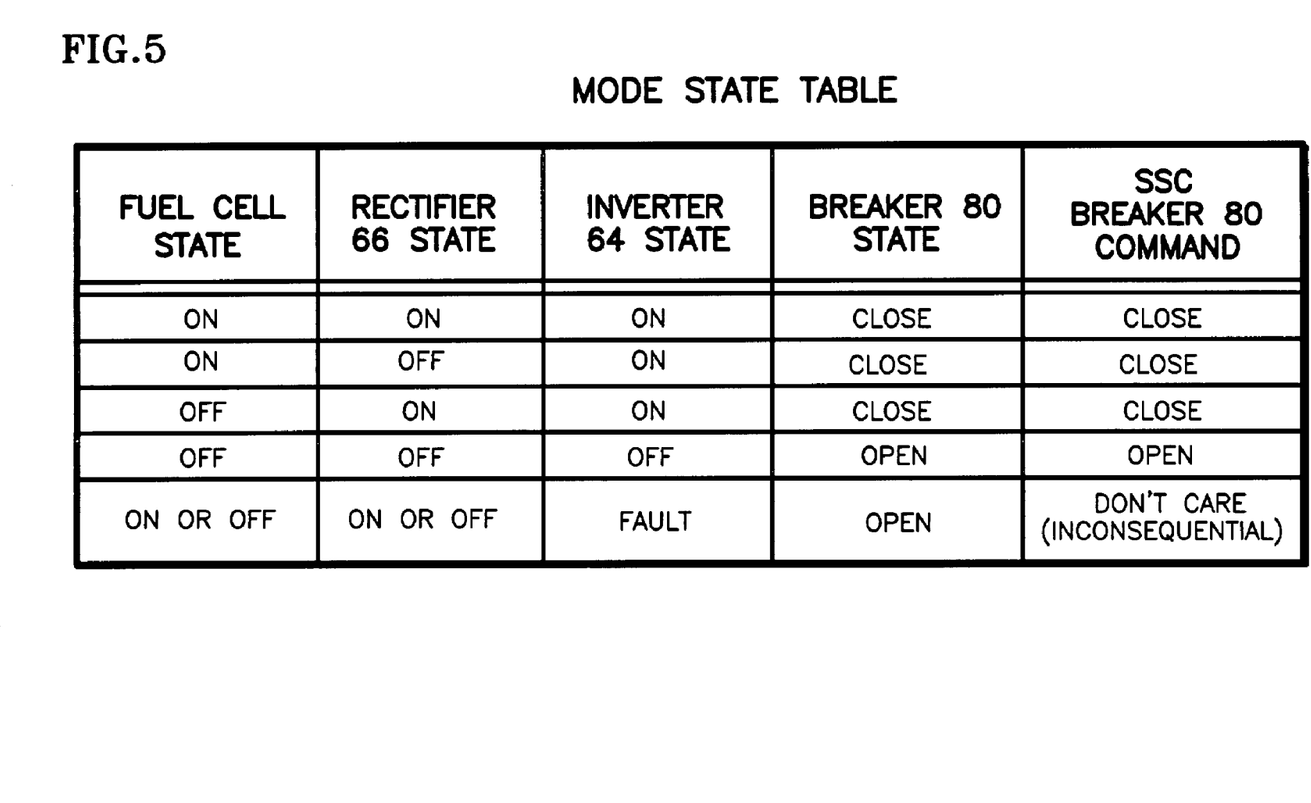
FIG. 5 is a table of the operational mode states of the fuel cell breaker in association with fuel cell and rectifier operating states.

However, during the intervals when the fuel cell 60 is "down" for maintenance and is not operational, the above-described arrangement is useful in assuring continued delivery of well-regulated power, by delivering power from the grid 10, 10" through the fuel cell power plant's 18 inverter 64 to the load(s). Moreover, this mode of providing power from the grid 10, 10" to the load(s) 14 via the rectifier 66 and the inverter 64 serves to provide a double conversion of the grid voltage from AC to DC and then back to AC power, which provides an additional degree of isolation between the grid 10 and the load(s) 14. At such time as the fuel cell 60 goes out of service, the logic of the static switch module 17 causes static switch 19 to open. This is accomplished by the SSC 29 monitoring the status of the fuel cell 60 via line 35 to determine if it is producing nominal power and if not, a signal is provided via line 52 to the static switch control logic 49 directing the static switch 19 to "open", or turn "off". This terminates the direct connection of the grid 10 to the load(s) 14, however now the new grid power path via line 10" through the rectifier 66 and the inverter 64 provides well-regulated AC power to the load(s) 14 via bus 15. The speed of static switch 19 and the existence of the connection from the grid 10 through rectifier 66 and inverter 64 assures a seamless transfer of the source of power used to power the load(s) 14, and, in the process, provides the isolation benefits of a double conversion system. Importantly, although the circuit breaker 80 has heretofore been opened to disconnect the power plant 18 from the bus 15 when the fuel cell 60 was not operating, it is now necessary in accordance with the invention to assure that circuit breaker 80 remains closed if the fuel cell 60 is not operating but the inverter 64 is connected to the grid 10 via branch 10" and rectifier 66. This determination and the control of the circuit breaker 80 are made by the SSC 29 via its connection 35 with the fuel cell 60 and PCS 62, and may involve sensors and/or logic associated therewith. Although such sensors and implementing circuitry are not shown in detail, it will be understood with reference to the Mode State Table of FIG. 5 that "on"/"off" determinations of the operating status of the fuel cell 60, the rectifier 66, and even the inverter 64, are made by appropriate sensors, and logic in the SSC 29 then provides the appropriate command signal(s) to breaker 80 to provide the appropriate breaker state. The exception to this routine is the instance in which inverter 64 may experience a fault, in which case its fault detector is directly effective to open breaker 80. In such latter instance, any command from the SSC 29 to the breaker 80 is ineffective or "inconsequential", and is labeled as "Don't Care" in the Table.

In accordance with yet a further aspect of the invention, the fuel cell power plant 18, and preferably the PCS 62 thereof, includes a stored energy device 74, here depicted as a capacitor 75, operatively connected to the inverter 64. The stored energy device 74 provides a ready supply of stored electrical energy for "riding through" or "smoothing" any brief interruptions or transients that may occur, either in the grid supply 10, 10" while the fuel cell 60 is out of service or, when only the fuel cell 60 is operating, during instantaneous load increases that cause a transient increase in the power demand and attendant decrease in the voltage provided by the fuel cell 60 to the inverter 64. In each instance, a decrease of the DC voltage below an acceptable level, or threshold, at the input to the inverter 64 will result in the stored energy device 74 releasing some of its energy in an effort to ride through the voltage decline. It will be appreciated that the stored energy device 74 may take forms other than capacitor 75, such as a battery or the like. The capacitor 75 has the advantage that it is relatively inexpensive and, like a battery, is electrically charged (and maintained) by its connection to the junction of the rectifiers 70 and 66 from the fuel cell 60 and the grid 10", respectively.

Each of the above three aspects of the invention is beneficial individually to the sustained provision of a continuous and even flow of electrical power to critical loads from a power system based on combined fuel cell and conventional power grid sources, particularly during the short intervals when the fuel cell may be out of service. Correspondingly, those benefits are increased by the inclusion of a combination, or preferably all, of those described aspects.

Although the invention has been described and illustrated with respect to the exemplary embodiments thereof, it should be understood by those skilled in the art that the foregoing and various other changes, omissions and additions may be made without departing from the spirit and scope of the invention. For example, further reliability in the combined power system may be obtained by techniques such as redundancy of parts of the system, as well as management of fuel resources to assure adequate availability of satisfactory fuel for the fuel cell, and the like.

What is claimed is:

1. A power system (8) for providing uninterrupted AC electric power to a critical load (14), comprising:
    a. a first power source (18) comprising at least one fuel cell power plant (18), the first power source normally providing sufficient power to supply at least the critical load (14) and being normally substantially continuously connected and providing power to, the critical load (14);
    b. a second AC power source (10) comprising a utility power grid normally providing sufficient power to supply the critical load (14);
    c. high speed isolation switching means (19) for selectively connecting and disconnecting the second power source (10) to the first power source (18) and to the critical load (14);
    d. a switch controller (49, 45) for controlling the state of the high speed isolation switching means (19) to connect the second power source (10) with the critical load (14) and the first power source (18) during normal operation of the second power source (10) whereby the first power source can provide any excess power to the second power source, and to rapidly disconnect the second power source (10) from the critical load (14) and the first power source (18) if and when operation of the second power source (10) deviates beyond a limit from normal;
    e. the at least one said fuel cell power plant (18) comprising a fuel cell (60) and a power conditioning system (PCS) (62) including an inverter (64), the fuel cell (60) being normally connected to supply DC power to the inverter (64) for conversion to AC power to supply the critical load (14), the power conditioning system (PCS) (62) operating to configure operation of the respective fuel cell (18) in a grid connected mode or in a grid independent mode in response to mode control signals (D1/401', D2/402');
    f. a site management controller (31) connected intermediate the switch controller (49, 45) and the power conditioning system (PCS) (62) and being responsive to preliminary mode signals (M1/401, M2/402) from the switch controller (49, 45) for providing the mode control signals (D1/401', D2/402') to the fuel cell power conditioning system (PCS) (62) to rapidly transition operation of the fuel cell power plant (18) between the grid connected and the grid independent modes; and
    g. power assurance means (65; 10", 66, 64, 70; 74,75) operatively connected to at least the inverter (64) of the PCS (62) of the fuel cell power plant (18) to provide an even and continuous supply of AC power to the critical load (14).

2. The power system (8) of claim 1 wherein the power assurance means (65; 10", 66, 64, 70; 74, 75) comprises at least a surge suppression means (65) for attenuating transient surges in the second power source (10) in the delivery of power to the load (14).

3. The power system (8) of claim 2 wherein the surge suppression means (65) comprises a line filter connected serially with the second power source (10) to buffer the load (14) against surges in the second power source (10).

4. The power system (8) of claim 1 wherein the power assurance means (65; 10", 66, 64, 70; 74, 75) comprises at least a double-conversion power connection means (10", 66, 64, 70) operatively connected between the second power source (10) and the load (14) to assure power delivery to the load (14) from the second power source (10), and with increased protective isolation.

5. The power system (8) of claim 4 wherein the double-conversion power connection means (10", 66, 64, 70) comprises a first rectifier (66) connected (10") from the second power source (10) serially to the inverter (64) for providing doubly-converted power from the second power source (10) to the load (14).

6. The power system (8) of claim 5 wherein the double-conversion power connection means (10", 66, 64, 70) further includes a second rectifier (70) connected serially with the fuel cell (60) and in parallel with the first rectifier (66) and second power source (10) to prevent backfeeding of power between the second power source (10) and the fuel cell (60) of the first power source (18).

7. The power system (8) of claim 5 wherein the power assurance means (65; 10", 66, 64, 70; 74, 75) further includes a capacitor (75) connected to the inverter (64) in parallel with at least the second power source (10) including the rectifier (66) to provide a third power source (74) for temporarily providing electrical energy to the inverter (64) and the load (14), and a line filter (65) connected serially with the second power source (10) for suppressing and attenuating transient surges in the second power source to thereby protect the load (14).

8. The power system (8) of claim 4 wherein the power assurance means (65; 10",66, 64, 70; 74, 75) comprises at least stored energy means (74) connected to provide electrical energy to the inverter (64) for a temporary interval during a decrease in the voltage to the inverter (64) from the second power source (10) and the fuel cell (60) of the first power source (18).

9. The power system (8) of claim 8 wherein the stored-energy means (74) comprises a capacitor (75) connected at least to the second power source (10) and the inverter (64).

10. The power system of claim 1 wherein the power assurance means (65; 10", 66, 64, 70; 74, 75) comprises at least stored energy means (74) connected to provide electrical energy to the inverter (64) for a temporary interval during a decrease in the voltage to the inverter (64) from at least the second power source (10).

11. A power system (8) for providing uninterrupted AC electric power to a critical load (14), comprising:
  a. a first power source (18) comprising at least one power plant (18), the first power source normally providing sufficient power to supply at least the critical load (14) and being normally substantially continuously connected and providing power to, the critical load (14);
  b. a second AC power source (10) comprising a utility power grid normally providing sufficient power to supply the critical load (14);
  c. high speed isolation switching means (19) for selectively connecting and disconnecting the second power source (10) to the first power source (18) and to the critical load (14);
  d. a switch controller (49, 45) for controlling the state of the high speed isolation switching means (19) to connect the second power source (10) with the critical load (14) and the first power source (18) during normal operation of the second power source (10) whereby any excess power from the first power source is available to the second power source, and to rapidly disconnect the second power source (10) from the critical load (14) and the first power source (18) if and when operation of the second power source (10) deviates beyond a limit from normal;
  e. the at least one said power plant (18) comprising means (60) for generating power and a power conditioning system (PCS) (62) including an inverter (64), the power generating means (60) being normally connected to supply DC power to the inverter (64) for conversion to AC power to supply the critical load (14), the power conditioning system (PCS) (62) operating to configure operation of the respective power plant (18) in a grid connected mode or in a grid independent mode in response to mode control signals (D1/401', D2/402');
  f. a site management controller (31) connected intermediate the switch controller (49, 45) and the power conditioning system (PCS) (62) and being responsive to preliminary mode signals (M1/401, M2/402) from the switch controller (49, 45) for providing the mode control signals (D1/401', D2/402') to the power conditioning system (PCS) (62) to rapidly transition operation of the power plant (18) between the grid connected and the grid independent modes; and
  g. power assurance means (65; 10", 66, 64, 70; 74,75) operatively connected to at least the inverter (64) of the PCS (62) of the power plant (18) to provide an even and continuous supply of AC power to the critical load (14).

12. The power system (8) of claim 11 wherein the power assurance means (65; 10", 66, 64, 70; 74, 75) comprises at least a surge suppression means (65) for attenuating transient surges in the second power source (10) in the delivery of power to the load (14).

13. The power system (8) of claim 12 wherein the surge suppression means (65) comprises a line filter connected serially with the second power source (10) to buffer the load (14) against surges in the second power source (10).

14. The power system (8) of claim 11 wherein the power assurance means (65; 10", 66, 64, 70; 74, 75) comprises at least a double-conversion power connection means (10", 66, 64, 70) operatively connected between the second power source (10) and the load (14) to assure power delivery to the load (14) from the second power source (10), and with increased protective isolation.

15. The power system (8) of claim 14 wherein the double-conversion power connection means (10", 66, 64, 70) comprises a first rectifier (66) connected (10") from the second power source (10) serially to the inverter (64) for providing doubly-converted power from the second power source (10) to the load (14).

16. The power system (8) of claim 15 wherein the double-conversion power connection means (10", 66, 64, 70) further includes a second rectifier (70) connected serially with the power generating means (60) and in parallel with the first rectifier (66) and second power source (10) to prevent backfeeding of power between the second power source (10) and the power generating means (60) of the first power source (18).

17. The power system (8) of claim 15 wherein the power assurance means (65; 10"66, 64, 70; 74, 75) further includes a capacitor (75) connected to the inverter (64) in parallel with at least the second power source (10) including the rectifier (66) to provide a third power source (74) for temporarily providing electrical energy to the inverter (64) and the load (14), and a line filter (65) connected serially with the second power source (10) for suppressing and attenuating transient surges in the second power source to thereby protect the load (14).

18. The power system (8) of claim 14 wherein the power assurance means (65; 10", 66, 64, 70; 74, 75) comprises at least stored energy means (74) connected to provide electrical energy to the inverter (64) for a temporary interval during a decrease in the voltage to the inverter (64) from the second power source (10) and the power generating means (60) of the first power source (18).

19. The power system (8) of claim 18 wherein the stored-energy means (74) comprises a capacitor (75) connected at least to the second power source (10) and the inverter (64).

20. The power system of claim 11 wherein the power assurance means (65; 10", 66, 64, 70; 74, 75) comprises at least stored energy means (74) connected to provide electrical energy to the inverter (64) for a temporary interval during a decrease in the voltage to the inverter (64) from at least the second power source (10).

* * * * *